United States Patent Office 3,635,906
Patented Jan. 18, 1972

3,635,906
PREPARATION OF POLYURETHANES USING ORGANO-TIN CATALYST AND TIME-LAPSE MODIFIER

Madhusudan D. Jayawant, Wilmington, Del., assignor to E. I. du Pont de Nemours and Company, Wilmington, Del.
No Drawing. Filed Nov. 12, 1968, Ser. No. 775,190
Int. Cl. C08g 22/34, 22/18; B01j 11/82
U.S. Cl. 260—77.5 AC                     15 Claims

ABSTRACT OF THE DISCLOSURE

Method of preparing polyurethanes by time-lapse catalysis which comprises:
(A) thoroughly mixing a reaction medium containing:
 (1) an organic polyisocyanate,
 (2) about 0.5–1.5 equivalent, per equivalent of organic polyisocyanate, of an organic polyhydroxy compound,
 (3) about 0.0001 to 0.1 mole, per equivalent of organic polyisocyanate, of a cure rate catalyst for the polyurethane reaction consisting essentially of amine-free organo-tin cure rate catalyst for the polyurethane reaction,
 (4) at least about 0.1 mole, per mole of amine-free organo-tin catalyst, of a time-lapse modifier selected from the group consisting of
  (a) β-dicarbonyl compounds having an enol content of at least about 4% and a dicarbonyl angle of not greater than about 120 degrees,
  (b) α-hydroxy ketones,
  (c) fused aromatic β-hydroxy ketones in which the hydroxyl group is attached to a carbon beta to the keto group in an adjacent ring, and
  (d) β-hydroxy nitrogen - heterocyclic fused aromatics in which the hydroxyl group is attached to a carbon beta to the nitrogen in an adjacent ring,
(B) applying the reaction mixture, and
(C) allowing the applied reaction mixture to cure at ambient temperature.

BACKGROUND OF THE INVENTION

Polyurethanes are widely used in a variety of applications, such as for preparing rigid and flexible foams, castings, adhesives and coatings. In many of these applications, it is either impractical or undesirable that the polyurethane composition be subjected to heat to provide a fully cured resin product. In such cases, it is necessary that a room temperature curing catalyst system be employed. However, no wholly suitable room temperature curable system has heretofore been provided. Room temperature curable systems generally suffer from either a pot life which is too short or a cure time which is too long. It would be desirable to provide a catalyst system for the polyurethane reaction which allows a combination of a long pot life and a short cure time.

SUMMARY OF THE INVENTION

It has now been discovered that certain chelate-forming compounds have the effect of delaying initiation of reaction between an organic polyisocyanate and an organic polyhydroxy compound in the presence of an amine-free organotin cure rate catalyst, thereby extending the pot life of the reaction medium without retarding the rate of cure, once cure is initiated. This effect is referred to herein as time-lapse catalysis. In accordance with this invention, polyurethanes can be prepared by time-lapse catalysis at room temperature by the process which comprises
(A) thoroughly mixing a reaction medium containing:
 (1) organic polyisocyanate,
 (2) about 0.5–1.5 equivalent, per equivalent of organic polyisocyanate, of organic polyhydroxy compound, the total of the isocyanate equivalents of polyisocyanate containing more than two isocyanate groups and the hydroxyl equivalents of polyhydroxy compound containing more than two hydroxyl groups is at least 50 percent of the total isocyanate and hydroxyl equivalents present in the reaction medium,
 (3) about 0.0001 to 0.1 mole, per equivalent of organic polyisocyanate, of a cure rate catalyst for the polyurethane reaction consisting essentially of amine-free organo-tin cure rate catalyst for the polyurethane reaction,
 (4) at least about 0.1 mole, per mole of organo-tin catalyst, of time-lapse modifier selected from the group consisting of
  (a) β-dicarbonyl compounds having an enol content of at least about 4% and a dicarbonyl angle of not greater than about 120 degrees,
  (b) α-hydroxy ketones,
  (c) fused aromatic β-hydroxy ketones in which the hydroxyl group is attached to a carbon beta to the keto group in an adjacent ring, and
  (d) β-hydroxy nitrogen-heterocyclic fused aromatics in which the hydroxyl group is attached to a carbon beta to the nitrogen in an adjacent ring,
(B) applying the reaction mixture, and
(C) allowing the applied reaction mixture to cure.

DESCRIPTION OF THE INVENTION

Polyurethanes are conventionally prepared by the reaction of an organic polyisocyanate, exemplified by organic diisocyanates of the formula OCN—R—NCO, and an organic polyol, exemplified by organic diols of the formula HO—R′—OH, to form a polyurethane in accordance with the equation $$O=C=N-R-N=C=O + HO-R'-OH \longrightarrow$$

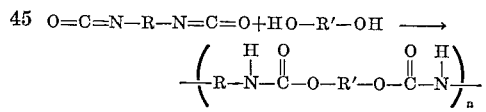

In the case of diisocyanates and diols, linear polyurethanes are obtained. When using polyisocyanates containing more than two isocyanate groups and/or polyols containing more than two hydroxyl groups, polyurethanes of branched or cross-linked structures are obtained.

The time-lapse catalysis of this invention is suitable for use in the preparation of all polyurethane compositions. Suitable organic polyisocyanates for use in accordance with this invention include aliphatic diisocyanates such as trimethylene diisocyanate, tetramethylene diisocyanate, pentamethylene diisocyanate, hexamethylene diisocyanate, octamethylene diisocyanate, decamethylene diisocyanate, butylene-1,2-diisocyanate, butylene-1,3-diisocyanate, ethylidene diisocyanate,

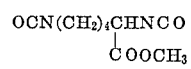

and

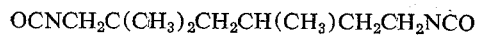

cycloaliphatic diisocyanates such as cyclohexylene diisocyanate, 4,4′-methylene bis(cyclohexyl isocyanate), and

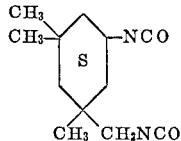

aromatic diisocyanates such as 2,4-toluene diisocyanate, 2,6-toluene diisocyanate, chlorinated toluene diisocyanates, meta-phenylene diisocyanate, chlorinated meta-phenylene diisocyanates, ortho-phenylene diisocyanate, brominated-meta-phenylene diisocyanate, meta-xylylene diisocyanate, para-xylylene diisocyanate, naphthalene-1,4-diisocyanate, naphthalene-1,5-diisocyanate, naphthalene-2,7 - diisocyanate, 4,4′-biphenylene diisocyanate, 3,3′-dichloro-4,4′-biphenylene diisocyanate, 3,3′-dimethyl-4,4′-biphenylene diisocyanate, 3,3′-dimethoxy-4,4′-biphenylene diisocyanate, 2,2′,5,5′-tetramethyl - 4,4′ - biphenylene diisocyanate, 2-nitro-4,4′-biphenylene diisocyanate, 3,3′-diphenyl-4,4′-biphenylene diisocyanate, 4,4′-methylene-bis(phenyl isocyanate), 4,4′-methylene-bis(2-methylphenyl isocyanate), 4,4′-isopropylene-bis(phenyl isocyanate),

where $n$ and $m$ are integers from 1 to 10, and fluorene diisocyanate; triisocyanates such as hexamethylene diisocyanate biuret of the formula

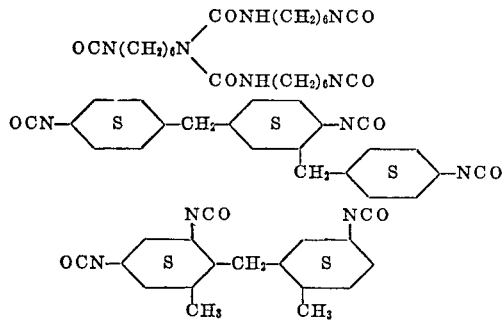

4,4′,4″-triphenylmethane triisocyanate and toluene-2,4,6-triisocyanate; tetraisocyanates such as

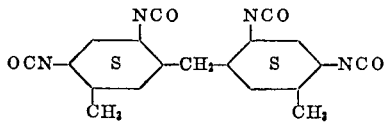

and mixtures thereof.

Suitable organic polyhydroxy compounds for reaction with the organic polyisocyanates include simple aliphatic polyols such as ethylene glycol, 1,2-propylene glycol, 1,3-butylene glycol, 2,3-butylene glycol, tetramethylene glycol, pentamethylene glycol, hexamethylene glycol, decamethylene glycol, 2,2-dimethyltrimethylene glycol, glycerine, trimethylolethane, trimethylolpropane, pentaerythritol, sorbitol, 1,6-hexanediol, 1,2,6-hexanetriol, 2-ethyl-1,3-hexanediol, castor oil, polyvinyl alcohol and partially hydrolyzed polyvinyl acetate; carbohydrates containing 5 to 8 hydroxyl groups such as sucrose, dextrose, and methylglucoside; ether polyols such as diethylene glycol and dipropylene glycol; aromatic polyols such as diphenylene glycol; and mixtures thereof.

Suitable higher molecular weight organic polyhydroxy compounds are the polyether polyols prepared by reaction of any of the above polyols with an alkylene oxide such as ethylene oxide, 1,2-propylene oxide, 1,3-propylene oxide, epichlorohydrin, epibromohydrin, 1,2-butene oxide and tetrahydrofuran. These polyether polyols are described by Price in U.S. Pat. No. 2,886,774 and include polyethylene glycol, polypropylene glycol and polytetramethylene ether glycol.

An additional class of high molecular weight polyhydroxy compounds for use in accordance with this invention are the polyester polyols prepared by reaction of more than one, but not more than two, hydroxyl equivalent weights of any of the above polyols with one equivalent weight of a polycarboxylic acid such as diglycolic, succinic, glutaric, adipic, suberic, azelaic, sebacic, phthalic, isophthalic, terephthalic, chlorendic and pyromellitic acids. Other high molecular weight polyhydroxy compounds include hydroxyalkyl acrylate and methacrylate monomers and polymers, including copolymers with aromatic compounds containing an ethylenically unsaturated side chain such as those described by Mayer et al. in U.S. Pat. 3,245,941.

A preferred combination of polyol and polyisocyanate for use with the time-lapse catalysis of this invention is an acrylic polyol polymer of (1) one or more of an ester of acrylic- or methacrylic acid with an alkanol of 1–18 carbon atoms, acrylonitrile, methacrylonitrile, vinyl chloride or vinyl fluoride;

(2) one or more of hydroxyethyl acrylate, hydroxypropyl acrylate, hydroxyethyl methacrylate or hydroxypropyl methacrylate; and (3) from 0% to 10%, by weight of acrylic or methacrylic acid, in combination with an aliphatic or cycloaliphatic polyisocyanate. A particularly preferred combination is an ethyl acrylate/hydroxyethyl methacrylate 68–80/ 20–40 polyol polymer or a methyl methacrylate/hydroxyethyl methacrylate 50–90/10–50 polyol polymer in combination with hexamethylene diisocyanate biuret.

In many cases the polyhydroxy compound and the polyisocyanate are pre-reacted to form a polyhydroxy- or polyisocyanate-terminated quasi-prepolymer. These prepolymers are used for various reasons such as to reduce the exotherm of the final polymerization reaction, to reduce the toxicity of monomeric polyisocyanates, or to reduce the viscosity of a particular polyol or polyisocyanate by reacting it with a more liquid polyisocyanate or polyol. Polyhydroxy-terminated prepolymers are prepared by reacting a polyol with less than a stiochiometric amount of a polyisocyanate. Polyisocyanate-terminated prepolymers are prepared by reacting a polyisocyanate with less than a stoichiometric amount of a polyol.

In the final polymerization, the organic polyisocyanate is generally reacted with substantially a stoichiometric amount of organic polyhydroxy compound. However, in some cases, such as in the case of many adhesives, prime coatings, etc., it may be desirable that there may be free hydroxyl or free isocyanate groups in the final polymer. In those cases, an excess of polyisocyanate or polyhydroxy compound is used. Generally, the amount of organic polyhydroxy compound used will be about 0.5 to 1.5 equivalent weight per equivalent weight of organic polyisocyanate. For this purpose, an equivalent weight of polyhydroxy compound is the molecular weight divided by the number of hydroxyl groups per molecule. Correspondingly an equivalent of polyisocyanate is the molecular weight of the polyisocyanate divided by the number of isocyanate groups present per molecule. Preferably, about 0.9 to 1.1 equivalent of polyhydroxy compound is present for each equivalent of polyisocyanate.

The time-lapse catalysis of this invention requires the presence of a cure rate catalyst for the polyurethane reaction consisting essentially of amine-free organo-tin cure rate catalyst for the polyurethane reaction. The time-lapse modifiers taught herein are effective only in the case of amine-free organo-tin catalysts. In fact, other organo-metallic catalysts may be made either more effective or less effective as cure rate catalysts by the addition of the chelating agents of this invention, without any time-lapse effect being observed. By "consisting essentially of amine-free organo-tin cure rate catalyst" it is meant that other cure rate catalysts should not be present in an amount sufficient to materially increase the rate of cure of the system. When another cure rate catalyst is present with the amine-free organo-tin catalyst in sufficient amount to increase the rate of the polyurethane reaction, the time-lapse benefits of this invention are lost to a corresponding extent.

Any conventional amine-free organo-tin catalyst for the polyurethane reaction may be used in accordance with this invention. These catalysts generally contain a di- or tetracovalent tin atom. Suitable amine-free organo-tin catalysts include those of the formulae: $R_3SnX$, $R_2SnX_2$, $RSnX_3$, $$Sn(OCR)_2, R_2SnY, RSnOOR', R(SnOOR')_2,$$

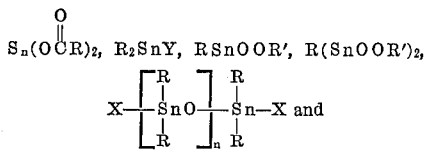

$R_2Sn(YRX)_2$ in which R is a hydrocarbon or amine-free substituted hydrocarbon radical such as alkyl, aralkyl, aryl, alkaryl, alkoxy, cycloalkyl, alkenyl, or cycloalkenyl; R' is the same as R, hydrogen or a metal ion; X is hydrogen, halogen, hydroxyl, alkoxy, amine-free substituted alkoxy, acyloxy, amine-free substituted acyloxy, acyl or an organic residue connected to tin through a sulfide link; and Y is chalcogen such as oxygen or sulfur. Typical examples of these catalysts are well known to those skilled in the art. For example, a long list of such catalysts can be found in U.S. Pat. 3,073,788.

Preferred organo-tin catalysts for use in accordance with this invention are those of the formula

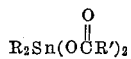

where R and R' are alkyl or cycloalkyl. Typical examples of these catalysts include dimethyltin diacetate, diethyltin diacetate, dibutyltin diacetate, dioctyltin diacetate, dilauryltin diacetate, dibutyltin dilaurate and dibutyltin dinaphthenate. Another preferred group of organo-tin catalysts is of the formula

where R is alkyl or alkenyl. Typical examples of these catalysts include stannous octoate, stannous oleate and stannous acetate. Still another preferred group of catalysts is of the formula $R_2SnO$, where R is alkyl. Typical examples of these catalysts are dimethyltin oxide, diethyltin oxide, dibutyltin oxide and dioctyltin oxide.

The amount of organo-tin catalyst used in accordance with this invention may vary from about 0.0001 to 0.1 mole per equivalent of organic polyisocyanate. Basically the amount of catalyst required is the same as has been required heretofore. However, in accordance with this invention much longer pot lives are encountered, and thus, where the amount of catalyst has heretofore been limited so as to provide a longer pot life, larger amounts can now be used. The length of the pot life can be regulated in accordance with this invention by the amount of time-lapse modifier added, and the cure time can be regulated by the amount of catalyst added. Preferably about 0.0002 to 0.05 mole of catalyst is present per equivalent of organic polyisocyanate.

One class of time-lapse modifier for use in accordance with this invention is β-dicarbonyl compounds having an enol content of at least about 4% and a dicarbonyl angle of not greater than about 120 degrees. By "enol content" is meant the enol content measured at 25° C. as the pure compound rather than as a solvent solution. It has been found that β-dicarbonyl compounds having a large enol contribution to the keto-enol equilibrium give a greater time-lapse effect than ones having a smaller contribution. An enol content of at least about 4% is required to provide significant results. An example of a β-dicarbonyl compound having an enol content below about 4% is diethyl malonate. Preferably the β-dicarbonyl compound has an enol content of at least about 30%.

By "dicarbonyl angle" is meant the angle formed by the intersection of a line extending from the carbonyl oxygen through the carbonyl carbon of the carbonyl group with a line extending from the hydroxyl oxygen through the hydroxyl carbon in a model of the compound in the enol form. When these lines are parallel, as in the case of 2,4-pentanedione, they intersect at infinity whereby the dicarbonyl angle is zero. These lines are assumed to be in the same plane since in the enol form the five atoms in the basic structure,

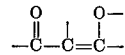

are in the same plane. Examples of compounds having a dicarbonyl angle in excess of 120 degrees are 1,3-indandione and 1,3-cyclobutanedione.

One preferred class of β-dicarbonyl compounds is β-diketones of the formula

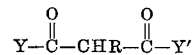

in which R is hydrogen, lower-alkyl or aryl, Y and Y' are aryl or —CXX'B wherein X and X' are hydrogen or halogen, and B is hydrogen, halogen or lower-alkyl. Typical β-diketones of this structure include 2,4-pentanedione,
1,1,1-trifluoro-2,4-pentanedione,
1,1,1,5,5,5-hexafluoro-2,4-pentanedione,
2,4-hexanedione,
2,4-heptanedione,
5-methyl-2,4-hexanedione,
2,4-octanedione,
5,5-dimethyl-2,4-hexanedione,
3-ethyl-2,4-pentanedione,
2,4-decanedione,
2,2-dimethyl-3,5-nonanedione,
3-methyl-2,4-pentanedione,
2,4-tridecanedione,
1-cyclohexyl-1,3-butanedione,
5,5-dimethyl-1,3-cyclohexanedione,
1,3-cyclohexanedione,
1-phenyl-1,3-butanedione,
1(4-biphenyl)-1,3-butanedione,
1-phenyl-1,3-pentanedione,
3-benzyl-2,4-pentanedione,
1-phenyl-5,5-dimethyl-2,4-hexanedione,
1-phenyl-2-butyl-1,3-butanedione,
1-phenyl-3-(2-methoxyphenyl)-1,3-propanedione,
1-(4-nitrophenyl)-1,3-butanedione,
1-(2-furyl)-1,3-butanedione,
1-(tetrahydro-2-furyl)-1,3-butanedione and
dibenzoylmethane.

Another preferred class of β-dicarbonyl compound is β-keto esters of the formula

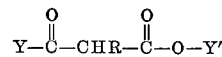

in which R is hydrogen, lower-alkyl or aryl, Y and Y' are aryl or —CXX'B wherein X and X' are hydrogen or halogen, and B is hydrogen, halogen or lower-alkyl. Typical examples of these esters are methyl acetoacetate, ethyl acetoacetate, α-methyl ethylacetoacetate, α-n-butyl ethylacetoacetate, α-sec.butyl ethylacetoacetate, α-ethyl methylacetoacetate, and α-ethyl ethylacetoacetate. Other β-dicarbonyl compounds which are suitable include α-acetyl-γ-butyrolactone, dimedone and 1-hydroxyanthraquinone.

Another class of suitable time-lapse modifiers is α-hydroxy ketones. The preferred α-hydroxy ketones are those of the formula

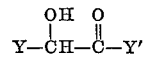

in which Y and Y' are aryl or —CXX'B wherein X and X' are hydrogen or halogen, and B is hydrogen, halogen or lower-alkyl. Typical examples of α-hydroxy ketones of this structure include benzoin, acetoin and α-hydroxyacetophenone.

Another class of compounds which function as time-lapse modifiers in accordance with this invention are fused aromatic β-hydroxy ketones in which the hydroxyl group is attached to a carbon in an adjacent ring beta to the keto group. These β-hydroxy ketones contain the structure

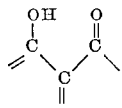

Typical examples of β-hydroxy ketones of this type include naphthazarin of the formula

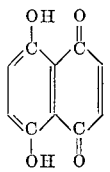

1-hydroxy-9-fluorenone of the structure

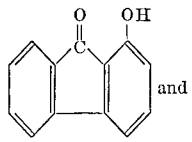

and and 1-hydroxy anthraquinone of the structure

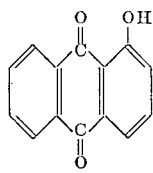

Still another class of suitable time-lapse modifiers is β-hydroxy nitrogen-heterocyclic fused aromatics in which the hydroxyl group is attached to a carbon in an adjacent ring beta to the nitrogen. These compounds contain the structure

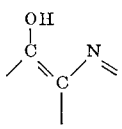

or its resonance equivalent structure

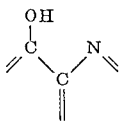

The preferred β-hydroxy nitrogen-heterocyclic fused aromatics are the 8-hydroxyquinolines of the formula

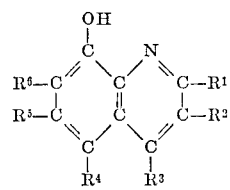

in which $R^1$, $R^2$, $R^3$, $R^4$, $R^5$, and $R^6$ are hydrogen, halogen or lower-alkyl. Other fused aromatics of this type include 7-hydroxy-3-hydrogen indoles, 8-hydroxy quinoxalines, 8-hydroxy quinazolines, 8-hydroxy cinnolines, 4-hydroxy phenanthridines of the structure

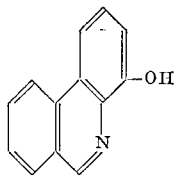

4-hydroxy acridines and 1-hydroxy phenazines of the structure

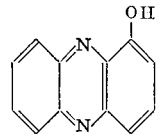

These compounds, which might be expected to be aromatic amine catalysts for the polyurethane reaction, have been found to impart a time-lapse effect rather than a catalytic effect when used in combination with an organo-tin catalyst in accordance with this invention.

Although it is not intended that this invention be limited to any particular theory, it is believed that the time-lapse catalysis of this invention is brought about by a rapid coordination complexing of the time-lapse modifier with the central tin atom of the catalyst. This coordination complexing is followed by a slow rate-determining displacement of the time-lapse modifier from the central tin atom by the nucleophilic isocyanate function of the organic polyisocyanate. The tin isocyanate complex is then rapidly attacked by the organic polyol component of the reaction mixture to form the polyurethane.

The length of the induction period obtained in accordance with this invention is dependent upon the proportion of time-lapse modifier present. In order to obtain a significant time-lapse effect, at least about 0.1 mole of time-lapse modifier should be present for each mole of organo-tin catalyst. There is no real upper limit on the amount of time-lapse modifier which may be used, but the use of more than about 15,000 moles of modifier per mole of catalyst is impractical and may result in a reduction in the rate of cure. Practical amounts of time-lapse modifier do not significantly slow down the rate of cure, once it is initiated. Preferably about 1–7000 moles of time-lapse modified are used for each mole of organo tin catalyst.

When the organo-tin catalyst contains a di-covalent tin atom, at least about one mole of time-lapse modifier should be present for each mole of catalyst. Preferably at least about 2 moles of modifier should be present per mole of catalyst. This is due to the fact that tetravalent tin is also an active catalyst while the fully complexed hexavalent form is believed to be the necessary form for time-lapse catalysis. The presence of at least one mole of time-lapse modifier per mole of catalyst may also be required when a tetra-covalent catalyst containing di-covalent tin as an impurity is used. This minimum amount of time-lapse modifier should also be used, regardless of the particular organo-tin catalyst, when the modifier is an α-hydroxy ketone or a β-hydroxy nitrogen-heterocyclic fused aromatic. The organo-tin coordination complex of these modifiers, in combination with uncoordinated organo-tin catalyst, gives a synergistic catalytic mixture. Accordingly time-lapse effects are not observed unless at least about one mole of these modifiers is present per mole of catalyst.

The length of the induction period is also affected to a significant extent by the temperature at which the composition is held. The time-lapse effect obtained for a given ratio of catalyst to modifier will increase as the temperature is lowered and decrease as the temperature is raised.

In order to increase the mobility of the system, the polyurethane reaction is generally carried out in the presence of at least about 1% by volume, based on the total composition, of a solvent for the polyurethane reaction. By "solvent for the polyurethane reaction" is meant a compound which gives a homogeneous mixture with the polyisocyanate and the polyhydroxy compound, and is inert, that is, does not contain an isocyanate group or a primary or secondary alcohol group which would enter into the polyurethane reaction. There is no upper limit on the amount of solvent which may be present except that imposed by the particular application. Preferably, the solvent is about 5–90% by volume of the total composition and has a boiling point of about 15–200° C. Most preferably the solvent is about 10–25% by volume of the total composition and has a boiling point of about 25–100° C.

Suitable solvents include hydrocarbons, esters, ketones, ethers, mixed ether-esters, and tertiary alcohols. Typical examples of suitable hydrocarbon solvents include benzene, chlorobenzene, toluene and xylene.

Suitable ester solvents include the methyl, ethyl, chloroethyl bromoethyl, propyl, isopropyl, butyl and amyl esters of carboxylic acids such as formic, acetic, chloroacetic, trichloroacetic, fluoroacetic, propionic, chloropropionic, acrylic, butyric, isobutyric, methacrylic, valeric, trimethylacetic, caproic, heptanoic and benzoic acids; the corresponding diesters of dicarboxylic acids such as oxalic, malonic and succinic acids; cycloaliphatic esters such as gamma-butyrolactone, and caprolactone; and glycol esters such as ethylene glycol diacetate and ethylene glycol diformate.

Suitable ketone solvents include aliphatic ketones of the formula

wherein R and R' are lower-alkyl such as methyl, ethyl, propyl, butyl, tertiary butyl, and isobutyl; and cycloaliphatic ketones such as cyclobutanone, cyclopentanone, cyclohexanone and cycloheptanone.

Suitable ether solvents include monoethers of the formula R—O—R' wherein R and R' are aliphatic, such as methyl, chloromethyl, ethyl, chloroethyl, dichloroethyl, bromoethyl, vinyl, propyl, isopropyl, allyl, butyl, amyl, isoamyl, hexyl, heptyl and octyl, or aromatic such as phenyl, tolyl or benzyl; cyclic ethers such as tetrahydrofuran, dioxane and dioxalane; and polyethers such as ethylene glycol dimethylether.

Other suitable solvents include mixed ether-esters such as Cellosolve acetate and methyl Cellosolve acetate; amides such as dimethyl acetamide and dimethyl formamide; carbon disulfide and dimethyl sulfoxide.

The compositions of this invention may also contain other additives such as fillers, pigments, toners, dyes, flow control agents, blowing agents, plasticizers, etc. The amount and type of additive will be determined by the particular application.

Because the compositions of this invention are reactive at room temperature, the total composition should not be mixed together until it is ready for use. These compositions therefore are handled as articles of commerce in the form of multi-package compositions. Each package of the multi-package composition may contain as many of the components as desired, provided the polyhydroxy compound and the polyisocyanate are in separate packages, that is, the polyhydroxy compound is in one package while the polyisocyanate is in another package. For example, one package may contain the polyhydroxy compound and the organo-tin catalyst, and the other package may contain the polyisocyanate and the time-lapse modifier. In another system the polyhydroxy compound, the organo-tin catalyst and the time-lapse modifier may be in one package and the polyisocyanate may be in the other. The solvent may be in either package or it may be split between the two packages. In some cases, it may be desirable to provide a three-package composition, for example, one in which the first package is a solvent solution of the polyhydroxy compound, the second package is a solvent solution of the polyisocyanate, and the third package is a mixture of the organo-tin cure rate catalyst and the time-lapse modifier.

In accordance with the process of this invention, the polyurethane is prepared by (1) thoroughly mixing the time-lapse catalyzed reaction mixture described herein,
(2) applying the reaction mixture such as by molding, casting, foaming, spraying, coating, etc., and
(3) allowing the applied reaction mixture to cure.

Preferably the reaction mixture is allowed to cure at ambient temperature, that is without external heating or cooling. The time-lapse catalyzed system of this invention is advantageously employed in those instances where the product is cured at ambient temperature, but is not limited thereto. For example, it is also advantageous in situations where extra long pot life or application time is required, but final cure is at elevated temperature.

The following examples, illustrating the novel compositions of this invention and the preparation of polyurethanes therefrom, are given without any intention that the invention be limited thereto. All parts and percentages are by weight unless otherwise specified.

EXAMPLES 1–4

A polyisocyanate prepolymer was prepared by heating 1044 grams (12 equivalents) of 2,4:2,6-toluene diisocyanate (80:20), in a 1-liter resin kettle with stirrer, to 70–80° C. under a blanket of nitrogen and adding dropwise a solution containing 268.2 grams (6 equivalents) of 1,2,6-hexanetriol in ethyl acetate over a period of 2–3 hours. After the addition, the reaction mixture was stirred at 70–80° C. for an additional three hours, cooled slightly, and drained into dry containers while still warm.

The isocyanate content of the polyisocyanate prepolymer was measured (modification of ASTM D–1638–61T) by reacting a weighed quantity (2–3 grams) of prepolymer with 20 ml. of dibutylamine solution (approximately 0.4 N) in toluene. The prepolymer was dissolved by magnetic stirring and allowed to react with the amine for 15 minutes. After adding 60 ml. of isopropyl alcohol as solvent, the unreacted amine was then back-titrated with 0.2 N hydrochloric acid using bromocresol green indicator. A 20-ml. sample of the amine solution was titrated with the hydrochloric acid solution. The isocyanate content (percent NCO) was determined by the equation $$\text{Percent NCO} = \frac{4.202 \; N \; (B-A)}{W}$$

where

N=normality of the HCl,
B=ml. of HCl used to titrate 20 ml. of amine,
A=ml. of HCl used to titrate unreated amine, and
W=weight of the isocyanate sample in grams.

The isocyanate content was found to be 18.7%.

Reaction media were prepared in accordance with the following recipe:

Polyisocyanate prepolymer—15 grams
Pluracol P–710—23.35 grams
Ethyl aceate—15.0 ml.
Dibutyltin dilaurate—0.6307 gram
Time-lapse modifier—variable The Pluracol P–710 was a poly(propylene ether) glycol of average molecular weight of 775 and an apparent equivalent weight of 379.7 sold by Wyandotte Chemical Co. The NCO:OH ratio was 1:1. The name and amount of time-lapse modifier present in the compositions is indicated in Table I.

The polyisocyanate prepolymer, the solvent and the time-lapse modifier were weighed in a dry 2-oz. bottle. The glycol and the tin catalyst were weighed in another dry 2-oz. bottle and both bottles were shaken for five minutes. At zero time the contents of the two bottles were mixed thoroughly and the reaction mixture was transferred to a 20 x 170 mm. test tube. A 3/16 inch steel sphere was dropped at the center of the surface of the reaction mixture in the tube, and the time required for the shpere to fall through 4 inches of vertical distance in the reaction mixture between two premarked points was recorded. The time, in minutes from zero time, that it took the reaction medium to reach a sphere fall-time of 50 seconds was considered to be the gel time.

TABLE I

| Example | Time-lapse modifier | Mole ratio of catalyst to modifier | Gel time, minutes |
|---|---|---|---|
| 1 | 2,4-pentanedione | 1:2 | 96 |
| 2 | do | 1:4 | 136 |
| 3 | 1-phenyl-1,3-butanedione | 1:2 | 133 |
| 4 | do | 1:4 | 210 |
| Control | None | 1:0 | 38 |

EXAMPLES 5–10

The procedure of Example 1 was repeated except that ambient temperature in these examples was somewhat higher than the ambient temperature in Examples 1–4. The following results were obtained:

TABLE II

| Example | Time-lapse modifier | Mole ratio of catalyst to modifier | Gel time, minutes |
|---|---|---|---|
| 5 | Acetoin | 1:2 | 31 |
| 6 | do | 1:4 | 40 |
| 7 | 8-hydroxyquinoline | 1:2 | 135 |
| 8 | do | 1:4 | 300 |
| 9 | Naphthazarin | 1:2 | 84 |
| 10 | do | 1:4 | >95 |
| Control | None | 1:0 | 25 |

EXAMPLES 11–12

The procedure of Example 1 was repeated except that the compositions were in accordance with the following recipe:

Polyisocyanate prepolymer—14.8 grams
Pluracol P-140—13.0 grams
Ethyl acetate—20.0 ml.
Dibutyltin dilaurate—0.6307 gram
Ethyl acetoacetate—variable The Pluracol P-410 was a poly(propylene ether) glycol of average molecular weight of 425 and an apparent equivalent weight of 216.8 sold by Wyandotte Chemical Co. The NCO:OH ratio was 1:1. The following data were obtained:

TABLE III

| Example | Time-lapse modifier, grams | Mole ratio of catalyst to modifier | Gel time, minutes |
|---|---|---|---|
| 11 | 0.39 | 1:3 | 70 |
| 12 | 0.78 | 1:6 | 83 |
| Control | 0 | 1:0 | 58 |

EXAMPLES 13–16

Example 1 was repeated except that the composition had the following recipe:

Polyisocyanate prepolymer of Example 1—20 grams
Pluracol P-410—19.3 grams
Ethyl acetate—15 ml.
Organo-tin catalyst—variable
2,4-pentanedione—variable The NCO:OH ratio was 1:1. The variables used and the resulting data are given in Table IV.

TABLE IV

| Example | Catalyst Name | Grams | Modifier, grams | Mole ratio of catalyst to modifier | Gel time, min. |
|---|---|---|---|---|---|
| 13 | Dibutyltin dinaphthenate | 0.487 | 0.3 | 1:3 | 99 |
| 14 | do | 0.487 | 0.6 | 1:6 | 163 |
| Control | do | 0.487 | 0 | 1:0 | 17 |
| 15 | Stannous acetate | 0.237 | 0.3 | 1:3 | 116 |
| 16 | do | 0.237 | 0.6 | 1:6 | 221 |
| Control | do | 0.237 | 0 | 1:0 | 51 |

EXAMPLES 17–18

A polyisocyanate prepolymer was prepared by heating 130 grams (1.5 equivalent) of 2,4:2,6-toluene diisocyanate (65:35) in a 1-liter resin kettle (stirrer) under a blanket of nitrogen to 70–80° C., and a solution of 26.8 grams (0.6 equivalent) of trimethylolpropane in ethyl acetate was added dropwise, while maintaining the temperature at 70–80° C. After the addition, a solution of 9.0 grams (0.2 equivalent) of 1,4-butanediol in ethyl acetate was added dropwise to the reaction mixture. The total ethyl acetate now present was 75 ml. The reaction mixture was further stirred for 3 hours at 80° C., cooled slightly, and drained into dry containers while still warm. The isocyanate content was 15.65%.

Example 13 was repeated except that the composition had the following recipe:

Polyisocyanate prepolymer—15 grams
Pluracol P-1010—19.9 grams
Ethyl acetate—15 ml.
Stannous octoate—0.02 gram
2,4-Pentanedione—variable Pluracol P-1010 was a poly(propylene ether) glycol of average molecular weight of 1050 and an apparent equivalent weight of 531.3 sold by Wyandotte Chemical Co. The NCO:OH ratio was 1:1. The amount of time-lapse modifier and the resulting data are given in Table V.

TABLE V

| Example | Time-lapse modifier, grams | Mole ratio of catalyst to modifier | Gel time, minutes |
|---|---|---|---|
| 17 | 0.2 | 1:40 | 202 |
| 18 | 0.4 | 1:80 | >>202 |
| Control | 0 | 1:0 | 54 |

EXAMPLES 19–26

Example 1 was repeated except that the composition had the following recipe:

Desmodur–L—20.0 grams
Pluracol TP–440 triol—7.8 grams
Ethyl acetate—26 ml.
Dibutyltin dilaurate—0.6307 gram
2,4-pentanedione—variable Desmodur–L was a 67% isocyanate prepolymer solution in a 50:50 mixture of xylene and Cellosolve acetate having an isocyanate content of 11.5% sold by Naftone Inc. Pluracol TP–440 triol was a polyoxypropylene derivative of trimethylolpropane having an average molecular weight of 425 and an apparent equivalent weight of 141.3 sold by Wyandotte Chemical Co. The NCO:OH ratio was 1:1. The amount of pentanedione and the data obtained are given in Table VI.

TABLE VI

| Example | Amount of modifier, grams | Mole ratio of catalyst to modifier | Gel time, minutes |
|---|---|---|---|
| 19 | 0.2 | 1:2 | 117 |
| 20 | 0.4 | 1:4 | 155 |
| 21 | 0.6 | 1:6 | 196 |
| 22 | 0.8 | 1:8 | 232 |
| 23 | 1.0 | 1:10 | 284 |
| 24 | 1.2 | 1:12 | 334 |
| 25 | 1.4 | 1:14 | 361 |
| 26 | 1.6 | 1:16 | 393 |
| Control | 0.0 | 1:0 | 77 |

EXAMPLES 27-28

These examples illustrate time-lapse catalysis of a polyurethane adhesive composition. The adhesive composition was prepared in accordance with the following recipe:

Polyisocyanate prepolymer of Example 1—2.125 grams
Partially hydrolyzed PVAc—4.05 grams
Ethyl acetate—2.7 grams
Dibutyltin dilaurate—0.3 gram
2,4-pentanedione—variable The polyvinyl acetate was 11.2 mole percent hydrolyzed. The NCO:OH ratio was 1:1. The amount of pentanedione and the results obtained are given in Table VII.

TABLE VII

| Example | Amount of modifier, grams | Mole ratio of catalyst to modifier | Gel time, minutes |
|---------|--------------------------|-----------------------------------|-------------------|
| 27      | 1.0                      | 1:21                              | 36                |
| 28      | 2.0                      | 1:42                              | 70                |
| Control | 0                        | 1:0                               | 9                 |

EXAMPLE 29

An adhesive composition was prepared in accordance with the following recipe:

Polyisocyanate prepolymer of Example 1—20.0 grams
Desmophen 750U—31.5 grams
Ethyl acetate—5 ml.
Dibutyltin dilaurate—0.3 gram
2,4-pentanedione—1.5 grams Desmophen 750U was a polyether polyol (80% in Cellosolve acetate) sold by Naftone Inc. The isocyanate to hydroxyl ratio was 1:1 and the catalyst to modifier mole ratio was 1:32. For comparison, a control composition containing no time-lapse modifier was also prepared. The strengths of the adhesive bonds were determined by lap shear on southern yellow pine without using clamps. Good bond strength is indicated by a high percentage of failure in the wood. The following data were obtained:

TABLE VIII

| Example | Pot life, minutes | Gel time, minutes | Cure, days | Bond strength, p.s.i. | Wood failure, percent |
|---------|-------------------|-------------------|------------|----------------------|----------------------|
| 29      | 45                | ~60               | 3          | 1,200                | 80                   |
|         |                   |                   | 6          | 1,250                | 100                  |
| Control | 5                 | 10                | 3          | 850                  | 0                    |
|         |                   |                   | 6          | 650                  | 0                    |

EXAMPLE 30

A two-package coating composition was prepared as follows:

A mill base was prepared by sand-grinding a mixture composed of 56.31 parts of rutile titanium dioxide, 29.13 parts of Desmophen 650 (a hydroxyl containing phthalate ester sold by Bayer Co.), and 14.56 parts of Cellosolve acetate. Package 1 was prepared in accordance with the recipe:

| | Percent |
|---|---|
| Mill base | 65.61 |
| Desmophen 650 | 30.84 |
| SF-1023 (10% in Cellosolve acetate) | 0.34 |
| 0.25 sec. Cellosolve acetate butyrate (25% solids in methyl isobutyl ketone) | 1.70 |
| Cellosolve acetate | 1.34 |
| Dibutyltin dilaurate | 0.17 |

SF-1023 is a silicone leveling agent sold by General Electric Co.

Package 2 was prepared in accordance with the recipe:

| | Percent |
|---|---|
| Cellosolve acetate | 3.52 |
| Ethyl acetate | 19.50 |
| Toluene | 11.18 |
| Desmodur N75 | 54.32 |
| 2,4-pentanedione | 11.48 |

Desmodur N75 is a 75% solution of hexamethylene diisocyanate biuret in a 50/50 Cellosolve acetate/xylene mixture sold by Naftone Inc.

The coating composition was prepared in accordance with the recipe:

| | Parts |
|---|---|
| Package 1 | 1218 |
| Package 2 | 823 |

The resultant pigmented composition, which had a catalyst to modifier mole ratio of 1:288, was reduced 5% with Cellosolve acetate for spray application, after which it had an initial viscosity of 26 sec. as measured in a No. 2 Zahn cup. After standing six hours the viscosity was 55 sec. A 2-mill coating, obtained by spraying the composition on a steel panel, was tack-free in one hour, tape-free in four hours, and gave a tough, durable, flexible finish.

A control composition was prepared similar to that described above, except that the 2,4-pentanedione was omitted. This composition gelled after one hour.

EXAMPLE 31

A three-package coating composition was prepared as follows:

Package 1 was prepared in accordance with the recipe:

| | Percent |
|---|---|
| Mill base of Example 30 | 65.61 |
| Desmophen 650 | 30.84 |
| SF-1023 (10% in Cellosolve acetate) | 0.34 |
| 0.5 sec. Cellosolve acetate butyrate (25% solids in methyl isobutyl ketone) | 1.70 |
| Cellosolve acetate | 1.51 |

Package 2 was prepared in accordance with the recipe:

| | Percent |
|---|---|
| Cellosolve acetate | 11.13 |
| Ethyl acetate | 23.29 |
| Toluene | 11.24 |
| Desmodur N | 54.34 |

Package 3 was prepared in accordance with the recipe:

| | Percent |
|---|---|
| 2,4-pentanedione | 99.67 |
| Dibutyltin dilaurate | 0.33 |

The coating composition was prepared in accordance with the following recipe:

| | Parts |
|---|---|
| Package 1 | 310.0 |
| Package 2 | 20.9 |
| Package 3 | 16.0 |

The resulting pigmented composition, which had a catalyst to modifier mole ratio of 1:1,900, was reduced 5% with Cellosolve acetate for spray application. The viscosity and coating characteristics were similar to those described in Example 30.

EXAMPLE 32

An alkyd resin was prepared as follows: To a standard alkyd apparatus set-up, equipped with water separator, was added 2.24 grams of dibutyltin oxide and 159.62 grams of trimethylolpropane. The kettle was heated to 200° F. after which 348.75 grams of 2-ethylhexanol were added. The kettle was heated further to 310° F. and held at that temperature for fifteen minutes after which 305.67 grams of phthalic anhydride was added. The reaction was then held at 302° F. for one hour after which 25.43 grams of xylene were added. The kettle was heated to 435° F. and the medium was refluxed until an acid number of 4 was obtained. An additional 75.28 grams of xylene were added and the medium was cooled. The total amount of water removed was 42 grams.

15

This alkyd resin composition was used as a shading base and catalyst for a coating composition in accordance with the recipe:

| | Parts |
|---|---|
| Package 1 of Example 31 | 1076 |
| Package 2 of Example 31 | 823 |
| Alkyd resin composition | 108 |
| 2,4-pentanedione | 166 |

The resulting dispersion, which had a catalyst to modifier ratio of 1:1493, had an initial viscosity of 26 sec. as measured in a No. 2 Zahn cup. After standing six hours at room temperature the dispersion had a viscosity of 40 sec. A 2-mil coating, obtained by spraying the composition on a steel panel was tape-free in 3 hours, and gave a tough, durable finish.

EXAMPLE 33

To a stainless steel reactor were charged 62.6 parts of n-butyl acetate. This charge was held at 126° C. under a nitrogen blanket, with stirring, while

| | Parts |
|---|---|
| Ethyl acrylate | 39.6 |
| Hydroxyethyl methacrylate | 23.0 |
| Azobisisobutyronitrile | 0.47 | were added over a three-hour period. This mixture was held at reflux temperature for 45 minutes after addition was complete. It was then cooled to about 65° C. and filtered through cheesecloth. The product was an ethyl acrylate/hydroxyethyl methacrylate 70/30 copolymer solution containing 47.47% polymer solids.

A mill base was prepared by mixing two hundred parts of this solution and 93.4 parts of rutile titanium dioxide with an equal amount of sand. The mixture was ground in a paint shaker for two hours and then filtered.

A portion of this mill base (153.7 parts) was mixed with a composition of the recipe:

| | Parts |
|---|---|
| Desmodur N75 | 35.6 |
| Dibutyltin dilaurate | 0.057 |
| SF-1025 (50% in Cellosolve acetate) | 0.076 |
| 2,4-pentanedione | 42.75 |

These were thoroughly mixed to give a composition having a mole ratio of catalyst to modifier of 1:4,732 and a pot life of 9 hours. The composition was sprayed on a steel panel to give a coating about 2 mils thick. The coating was tack-free in one hour, tape-free in two hours and gave a tough, durable, flexible finish.

A control composition, which was identical with the above composition except that the 2,4-pentanedione was omitted, had a pot life of two hours.

EXAMPLE 34

Three 2-package compositions were prepared as follows. Package 1 had the following recipe:

| | Parts |
|---|---|
| Voranol CP-260 | 425 |
| 4,4'-methylene bis(cyclohexyl isocyanate) | 1310 |
| Toluene | 1160 |
| Dibutyltin dilaurate | 1.73 |

Voranol CP-260 was a polyol having a hydroxyl number of 650 sold by Dow Chemical Co. The resulting polyisocyanate prepolymer had an isocyanate content of 7.27%.

The compositions were prepared in accordance to the following recipes:

| | A | B | C | Control |
|---|---|---|---|---|
| Package 2: | | | | |
| Castomer PL-500 | 100 | 100 | 100 | 100 |
| Ethyl acetate | 41.8 | 39.6 | 18 | 42 |
| 2,4-pentanedione | 0.24 | 2.4 | 24 | |
| Package 1 | 254 | 254 | 254 | 254 |

Castomer PL-500 was a polycaprolactone having a molecular weight of 500 sold by Isocyanate Products, Inc.

16

The resulting compositions had the following properties:

| | A | B | C | Control |
|---|---|---|---|---|
| Mole ratio catalyst to modifier | 1:10 | 1:100 | 1:1,000 | 1:0 |
| NCO/OH | 1.1 | 1.1 | 1.1 | 1.1 |
| Pot life, hours | 1.25 | 9–10 | >24 | 1 |

Three-mil films were cast and allowed to cure at 75° F. and 50% relative humidity. Various tests were carried out on these films to determine the extent of cure. The following results were obtained:

| | A | B | C | Control |
|---|---|---|---|---|
| Sward hardness: | | | | |
| 1 day cure | 34 | 34 | 32 | 32 |
| 5 day cure | 36 | 38 | 36 | 36 |
| Pencil hardness: | | | | |
| 1 day cure | 2B | 2B | 2B | 2B |
| 5 day cure | B | B | B | B |
| Tensile at break, p.s.i./percent elongation: | | | | |
| 1 week cure | 3,850/180 | 3,900/190 | 3,900/200 | 3,560/185 |
| 1 month cure | 5,600/165 | 5,800/170 | 5,350/170 | 5,650/165 |
| Taber abrasion index, mg./$10^3$ rev.: | | | | |
| 1 week cure | 20 | 23 | 23 | 26 |
| 1 month cure | 20 | 18 | 20 | 25 |
| Gardner impact, lbs. to failure: | | | | |
| Direct | >160 | >160 | >160 | >160 |
| Indirect | >160 | >160 | >160 | >160 |

Taber Abrasion Index was measured using a CS-17 wheel while at 100 gram load.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. Method of preparing a polyurethane by time-lapse catalyst which comprises thoroughly mixing a reaction medium consisting essentially of
   (1) organic polyisocyanate,
   (2) 0.5–1.5 equivalent, per equivalent of organic polyisocyanate, of organic polyhydroxy compound, the total of the isocyanate equivalents of polyisocyanate containing more than two isocyanate groups and the hydroxyl equivalents of polyhydroxy compound contaning more than two hydroxyl groups being at least 50 percent of the total isocyanate and hydroxyl equivalents present in the reaction medium,
   (3) 0.0001 to 0.1 mole, per equivalent of organic polyisocyanate, of a cure rate catalyst for the polyurethane reaction consisting essentially of amine-free organo-tin cure rate catalyst for the polyurethane reaction,
   (4) at least 0.1 mole, per mole of amine-free organo-tin catalyst, of time-lapse modifier selected from the group consisting of
      (a) β-dicarbonyl compounds having an enol content of at least 4% and a dicarbonyl angle of not greater than 120 degrees,
      (b) α-hydroxy ketones,
      (c) fused aromatic β-hydroxy ketones in which the hydroxyl group is attached to a carbon beta to the keto group in an adjacent ring, and
      (d) β-hydroxy nitrogen-heterocyclic fused aromatics in which the hydroxyl group is attached to a carbon beta to the nitrogen in an adjacent ring, and allowing the reaction mixture to cure.

2. The method of claim 1 in which 0.9–1.1 equivalent of polyhydroxy compound and 0.0002 to 0.05 mole of amine-free organo-tin catalyst are present per equivalent of polyisocyanate, 1–7000 moles of time-lapse modifier are present per mole of amine-free organo-tin catalyst, and the reaction mixture is cured at ambient temperature.

3. The method of claim 2 in which the time-lapse modifier is selected from the group consisting of (a) β-diketones of the formula

(b) β-ketoesters of the formula

(c) α-hydroxyketones of the formula

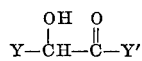

and (d) 8-hydroxyquinolines of the formula

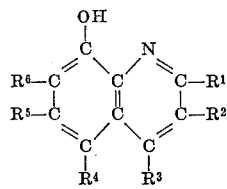

in which R is hydrogen, lower-alkyl or aryl, Y and Y' are aryl or —CXX'B wherein X and X' are hydrogen or halogen and B is hydrogen, halogen or lower-alkyl, and $R^1$, $R^2$, $R^3$, $R^4$, $R^5$ and $R^6$ are hydrogen, halogen or lower-alkyl, and the amine-free organo-tin catalyst is selected from the group consisting of (a) $R_2Sn(OCR')_2$ (with C=O)

in which R and R' are alkyl or cycloalkyl, (b) $Sn(OCR)_2$ (with C=O)

in which R is alkyl or alkenyl, and (c) $R_2SnO$ in which R is alkyl.

4. The method of claim 3 in which the time-lapse modifier is a β-diketone having an enol content of at least 30% and the amine-free organo-tin catalyst is selected from the group consisting of dibutyltin dilaurate, dibutyltin dinaphthenate, stannous acetate, stannous octoate and dibutyltin oxide.

5. The method of claim 4 in which the time-lapse modifier is 2,4-pentanedione.

6. A composition for preparing room temperature curable polyurethanes by time-lapse catalysis which consists essentially of (1) organic polyisocyanate,
(2) 0.5–1.5 equivalent, per equivalent of organic polyisocyanate, of organic polyhydroxy compound, the total of the isocyanate equivalents of polyisocyanate containing more than two isocyanate groups and the hydroxyl equivalents of polyhydroxy compound containing more than two hydroxyl groups being at least 50 percent of the total isocyanate and hydroxyl equivalents present in the reaction medium,
(3) 0.0001 to 0.1 mole, per equivalent of organic polyisocyanate, of a cure rate catalyst for the polyurethane reaction consisting essentially of amine-free organo-tin cure rate catalyst for the polyurethane reaction,
(4) at least 0.1 mole, per mole of amine-free organo-tin catalyst, of time-lapse modifier selected from the group consisting of
  (a) β-dicarbonyl compounds having an enol content of at least 4% and a dicarbonyl angle of not greater than 120 degrees,
  (b) α-hydroxy ketones,
  (c) fused aromatic β-hydroxy ketones in which the hydroxyl group is attached to a carbon beta to the keto group in an adjacent ring, and
  (d) β-hydroxy nitrogen-heterocyclic fused aromatics in which the hydroxy group is attached to a carbon beta to the nitrogen in an adjacent ring.

7. The composition of claim 6 in which 0.9–1.1 equivalent of polyhydroxy compound and 0.0002 to 0.05 mole of amine-free organo-tin catalyst are present per equivalent of polyisocyanate, and 1–7000 moles of time-lapse modifier are present per mole of amine-free organo-tin catalyst.

8. The composition of claim 7 in which the time-lapse modifier is selected from the group consisting of (a) β-diketones of the formula

(b) β-ketoesters of the formula

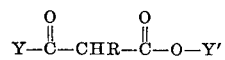

(c) α-hydroxyketones of the formula

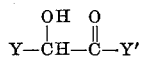

and (d) 8-hydroxyquinolines of the formula

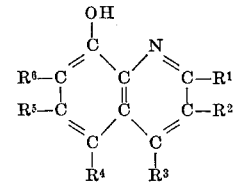

in which R is hydrogen, lower-alkyl or aryl, Y and Y' are aryl or —CXX'B wherein X and X' are hydrogen or halogen and B is hydrogen, halogen or lower-alkyl, and $R^1$, $R^2$, $R^3$, $R^4$, $R^5$ and $R^6$ are hydrogen, halogen or lower-alkyl, and the amine-free organo-tin catalyst is selected from the group consisting of (a) $R_2Sn(OCR')_2$ (with C=O)

in which R and R' are alkyl or cycloalkyl, (b) $Sn(OCR)_2$ (with C=O)

in which R is alkyl or alkenyl, and (c) $R_2SnO$ in which R is alkyl.

9. The composition of claim 8 in which the time-lapse modifier is a β-diketone having an enol content of at least 30% and the amine-free organo-tin catalyst is selected from the group consisting of dibutyltin dilaurate, dibutyltin dinaphthenate, stannous acetate, stannous octoate, and dibutyltin oxide.

10. The composition of claim 9 in which the time-lapse modifier is 2,4-pentanedione.

11. The composition in accordance with claim 9 in which the organo-tin catalyst is dibutyltin dilaurate or dibutyltin oxide, the organic polyisocyanate is hexamethylene diisocyanate biuret, and the β-diketone is 2,4-pentanedione.

12. The composition in accordance with claim 9 in which the organo-tin catalyst is dibutyltin dilaurate or dibutyltin oxide, the organic polyisocyanate is methylene bis-(cyclohexyl isocyanate) and the β-diketone is 2,4-pentanedione.

13. A time-lapse catalyst composition for preparing room temperature curable polyurethanes which consists essentially of (a) A cure rate catalyst for the polyurethane reaction consisting essentially of amine-free organo-tin cure rate catalyst for the polyurethane reaction,
(b) at least 0.1 mole, per mole of amine-free organo-tin catalyst, of time-lapse modifier selected from the group consisting of (1) β-ketoesters of the formula

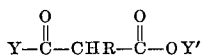

in which R is hydrogen, lower-alkyl or aryl, Y and Y' are aryl or —CXX'B wherein X and X' are hydrogen or halogen and B is hydrogen, halogen or lower-alkyl, (2) α-hydroxy ketones, (3) fused aromatic β-hydroxy ketones in which the hydroxyl group is attached to a carbon beta to the keto group in an adjacent ring, and (4) β-hydroxy nitrogen-heterocyclic fused aromatics in which the hydroxyl group is attached to a carbon beta to the nitrogen in an adjacent ring.

14. The time-lapse catalyst composition of claim 13 in which 1–7000 of moles of time-lapse modifier are present per mole of amine-free organo-tin catalyst, the time-lapse modifier is selected from the group consisting of (a) β-ketoesters of the formula

(b) α-hydroxyketones of the formula

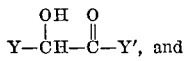

(c) 8-hydroxyquinolines of the formula

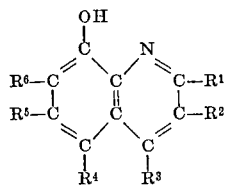

in which R is hydrogen, lower-alkyl or aryl, Y and Y' are aryl or —CXX'B wherein X and X' are hydrogen or halogen, and B is hydrogen, halogen or lower alkyl, and $R^1$, $R^2$, $R^3$, $R^4$, $R^5$ and $R^6$ are hydrogen, halogen or lower-alkyl, and the amine-free organo-tin catalyst is selected from the group consisting of (a) 

in which R and R' are alkyl or cycloalkyl, (b) 

in which R is alkyl or alkenyl, and (c) $R_2SnO$ in which R is alkyl.

15. The time-lapse catalyst composite of claim 14 in which the amine-free organo-tin catalyst is selected from the group consisting of dibutyltin dilaurate, dibutyltin dinaphthenate, stannous acetate, stannous octoate, and dibutyltin oxide.

References Cited

UNITED STATES PATENTS

| | | | |
|---|---|---|---|
| 2,929,800 | 3/1960 | Hill | 260—77.5 |
| 3,072,582 | 1/1963 | Frost | 260—2.5 |
| 3,346,536 | 10/1967 | Kauder et al. | 260—45.85 |
| 3,468,860 | 9/1969 | Hsieh | 260—88.3 |
| 3,523,103 | 8/1970 | Zemlin | 260—75 |
| 3,248,373 | 4/1966 | Barringer | 260—77.5 |
| 3,314,834 | 4/1967 | Walden et al. | 149—19 |
| 3,405,162 | 10/1968 | Kuryla | 260—465.6 |

DONALD E. CZAJA, Primary Examiner

H. S. COCKERAM, Assistant Examiner

U.S. Cl. X.R.

252—431 N, 431 R; 260—18TW, 77.5 AB